No. 826,419. PATENTED JULY 17, 1906.
F. B. GARDNER.
HORSESHOE.
APPLICATION FILED DEC. 15, 1905.
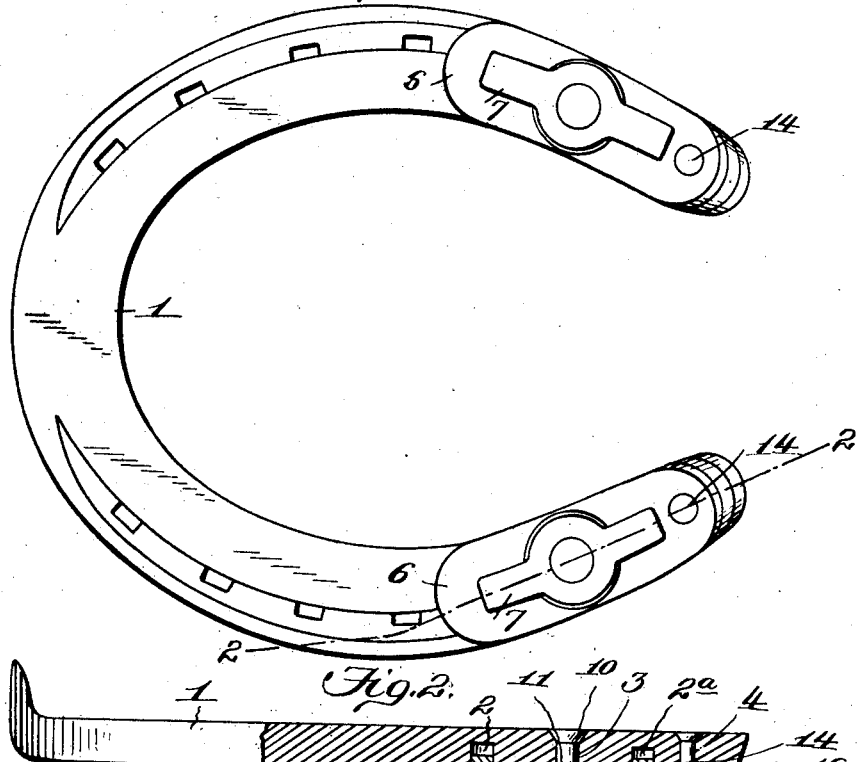
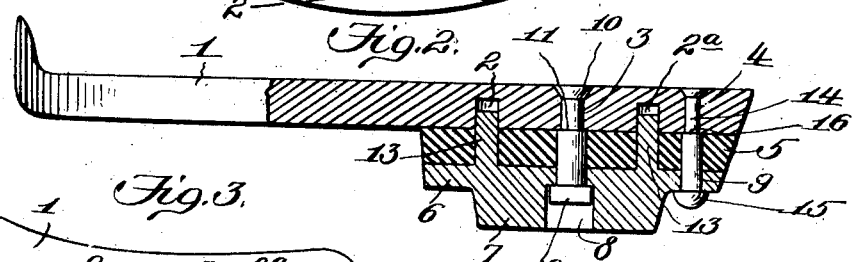
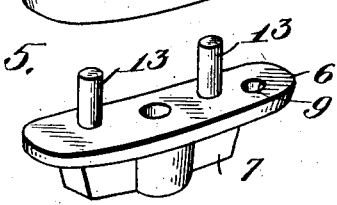
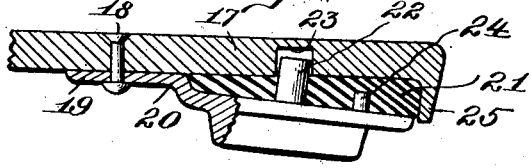
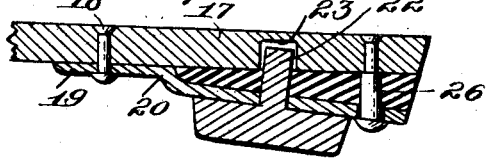
Witnesses:
Inventor
Frank B. Gardner
By James L. Norris
Atty

UNITED STATES PATENT OFFICE.

FRANK B. GARDNER, OF CRIDERSVILLE, OHIO, ASSIGNOR TO THE HUMANE HORSESHOE COMPANY, OF LIMA, OHIO, A CORPORATION OF OHIO.

HORSESHOE.

No. 826,419.   Specification of Letters Patent.   Patented July 17, 1906.

Application filed December 15, 1905. Serial No. 291,954.

*To all whom it may concern:*

Be it known that I, FRANK B. GARDNER, a citizen of the United States, residing at Cridersville, in the county of Auglaize and State of Ohio, have invented new and useful Improvements in Horseshoes, of which the following is a specification.

This invention relates to a construction of horseshoe provided with a removable cushioned calk, and is devised with the object of diminishing concussion to and preventing the animal accidentally pulling off the calk in case of meeting with an obstruction; and the object thereof is to construct a horseshoe with a removable cushioned calk in a manner, as hereinafter more specifically referred to, whereby all the advantages of elasticity of tread and the consequent avoidance of concussion due to hard pavements or roads and the accidental pulling off of the calk when the animal's hoofs strike an obstruction is obtained without, on the one hand, the disadvantage as regards want of durability for the shoe, particularly at the heel portion, and, on the other hand, without any injurious effect upon the animal's hoofs.

The invention further aims to provide the shoe with a removable and replaceable calk provided with a removable and compressible cushioning means which can be readily fitted to horseshoes now in general use without the necessity of any special machinery or tools and without changing the contour of the shoe whatsoever and to further provide the shoe with means whereby the compressing of the cushioning element will be limited, thereby obtaining longevity for said element, said means also constituting a stop to limit the movement in one direction of the calk proper.

The invention further aims to provide a horseshoe in a manner, as hereinafter set forth, which shall be simple in its construction, strong, durable, efficient in its use, and comparatively inexpensive to manufacture.

With the foregoing and other objects in view the invention consists of the novel construction, combination, and arrangement of parts hereinafter more specifically described, and illustrated in the accompanying drawings, wherein is shown the preferred embodiment of the invention; but it is to be understood that changes, variations, and modifications can be resorted to which come within the scope of the claims hereunto appended.

In the drawings, wherein like reference characters denote corresponding parts throughout the several views, Figure 1 is a bottom plan of a horseshoe in accordance with this invention. Fig. 2 is a section on the line 2 2 of Fig. 1. Fig. 3 is a bottom plan view of the shoe with the calk removed. Fig. 4 is a detail of the cushion. Fig. 5 is a detail of the calk and its plate. Fig. 6 is a sectional view of a modification, and Fig. 7 is a like view of another modified form.

Referring to the drawings, the shoe is indicated by the reference character 1 and each of the heels thereof provided with the sockets 2 $2^a$ and a pair of openings 3 4. The shoe is of known construction, with the exception of the providing of the sockets 2 $2^a$ and the openings 3 4, the construction of the shoe not being otherwise changed.

Mounted against the tread portion of each of the heels of the shoe is a flat piece of resilient or elastic material, preferably rubber, (indicated by the reference character 5,) and constituting a compressible cushion which is adapted to diminish concussion upon the animal when the shoe is worn and at the same time obtain an elastic tread. The cushion 5 is provided with a series of openings which are adapted to aline with the sockets 2 $2^a$ and the openings 3 4. Mounted against each of the cushions 5 is a combined calk-carrying and cushion-retaining flat plate 6 of a length and of a contour substantially the same as the cushion 5, and said plate has formed integral therewith a calk 7 of a length less than the plate and of any suitable shape. Extending through the center of the calk 7 and also through the center of the plate 6 is an opening 8, which is adapted to aline with the opening 3, and said plate 6 is furthermore provided at the rear end thereof with an opening 9, which is adapted to aline with the opening 4.

Each of the plates 6 is connected to its respective heel through the medium of a holdfast device 10, riveted at one end in the opening 3 and provided with a shoulder 11 and a head 12. The holdfast device 10 extends through the opening 8 and is of less length than the combined thickness of the heel, the cushion, the plate 6, and the calk 7. The shoulder 11 abuts against the heel. The head 12 plays in that portion of the opening 8 which is formed in the calk 7 and which is of greater diameter than that portion of the opening 8 which is formed in the plate 6. By such an arrangement the plate and the calk are connected to the shoe; but movement in one direction of the plate 6 and calk 7 is limited, owing to the fact that the head of the holdfast device engages said plate 6 and arrests the movement thereof. The movement of the plate 6 toward the heel is also limited, consequently limiting the compression of the cushion. To obtain this limited compression of the cushion, which insures longevity to the cushion, the inner face of each of the plates 6 is provided with a pair of lugs 13, which extend through the cushion and play in the sockets 2 2ª, the lugs 13 being of such length as to not engage the inner walls of the sockets until the cushion is compressed. When the lugs 13 engage the inner walls of the sockets, then the compression of the cushion is arrested. This also forms a means, as before stated, to limit the movement of the plate 6 toward the heel.

To prevent the animal from pulling off the calk, or rather calk-plate, a holdfast device 14 is provided, which has one end riveted in the opening 4 and its other end formed with a head 15, and the said holdfast device 14 is formed with a shoulder 16, which when the holdfast device 14 is in position bears against the heel of the shoe. The said holdfast device 14 extends through the opening 9 of the plate 6, and the head 15 thereof bears against the outer face of the plate. The holdfast device 14 loosely extends through the plate 6, so that the movement of the plate toward the heel will not be interfered with by said holdfast device 14; but the outward movement of the plate 6 is limited by the head 15 of said holdfast device 14 in the same manner as the head 12 of the holdfast device 14.

The shoulders 11 16 of the holdfast devices 10 and 14 prevent the passage of the holdfast devices through the heels of the shoe, so as to prevent injury to the animal's hoofs, and the lugs 13 of the plate 6 prevent the shifting of the cushion when the said plates are connected to the shoe through the medium of the holdfast devices 10.

In the modified form shown in Figs. 6 and 7 the heel of the shoe is indicated by the reference character 17, and which has connected thereto through the medium of a holdfast device 18 one end of the calk-carrying plate 19. The latter is bent is such a manner, as at 20, so as to offset the disconnected end of the plate 19 from the heel, forming thereby a recess between the heel and the inner face of the plate for the reception of a cushion 21. The plate 19 is formed with a lug or pin 22, which extends through the cushion 21 and engages in the socket 23, formed in the heel 17. The function of the stud 22 is the same as the lugs 13. The plate 20 is furthermore provided with an additional lug 24, which is adapted to engage in the cushion 21 to prevent lateral play thereof. The differences in the structures of Figs. 6 and 7 reside in the means of preventing the animal from pulling off the plate 20. In Fig. 6 this means consists of providing the heel 17 with a depending protuberance 25, which extends at the forward end of the cushion 21, and this protuberance prevents the animal from pulling off the plate, as it is evident that, owing to the length of the protuberance, the same extending to a point in alinement with the lower face of the plate 20, nothing could be interposed between the heel of the plate so as to pull the plate from the shoe. In Fig. 7 the means to prevent the pulling off of the plate consists of a holdfast device 26, which is constructed, positioned, and performs the same function as the holdfast device 14.

It will be evident from the foregoing construction of horseshoe that a simple and inexpensive cushioned calk is set up which can be readily fitted to the shoe, and, furthermore, a means is set up to prevent the accidental pulling off of the calk-plate by the animal. It will furthermore be evident that no special shoe construction is necessary, which is a material advantage, for the reason that it permits the calk to be fitted to any style of shoe now in general use. It will furthermore be evident that the elasticity of the tread obtained by the construction of shoe in the manner as set forth has the effect of not only diminishing concussion, but of increasing the durability of the shoe, and, furthermore, the rubber cushions besides affording elasticity of tread act also as insulators to prevent the transmission to the hoof of the heat generated by friction or acquired by contact with the hot pavements.

Having thus fully described my invention, what I claim as new, and desire to secure by Letters Patent, is—

1. A horseshoe having each of its heels provided with a socket, a cushion mounted against each heel, a calk-plate engaging said cushion and provided with a lug extending through the cushion and engaging in said socket, means extending through the plates for connecting them to the shoe, and means at the outer end of the cushions to prevent the pulling off of the calk-plates accidentally.

2. A horseshoe having each of its heels provided with a socket, a cushion mounted against each heel, a calk-plate engaging each of the cushions, a lug carried by each of said plates and extending through each of the cushions and engaging in the sockets, said lugs adapted to limit the movement in one direction of said plates and the compression of said cushions, a calk carried by each of the plates, and means extending through the calks and plates for shiftably connecting them to the shoe and for limiting the movement of the plates in the other direction.

3. A horseshoe having each of its heels provided with a socket, a cushion mounted against each heel, a calk-plate engaging each of the cushions, a lug carried by each of said plates and extending through each of the cushions and engaging in the sockets, said lugs adapted to limit the movement in one direction of said plates and the compression of said cushions, a calk carried by each of the plates, means extending through the calks and plates for shiftably connecting them to the shoe and for limiting the movement of the plates in the other direction, and means extending through the plates and fixed to the shoe to prevent the accidental pulling off of the plates.

In testimony whereof I have hereunto set my hand in presence of two subscribing witnesses.

FRANK B. GARDNER.

Witnesses:
    J. E. GROSJEAN,
    T. C. PENNELL.